(12) United States Patent
Liu et al.

(10) Patent No.: US 7,558,348 B1
(45) Date of Patent: Jul. 7, 2009

(54) RADIO FREQUENCY ANTENNA SYSTEM AND HIGH-SPEED DIGITAL DATA LINK TO REDUCE ELECTROMAGNETIC INTERFERENCE FOR WIRELESS COMMUNICATIONS

(75) Inventors: Tao Liu, Sunnyvale, CA (US); Mansour Keramat, San Jose, CA (US); Mehrdad Heshami, Palo Alto, CA (US); Feng Bao, San Jose, CA (US); Timothy C. Kuo, Cupertino, CA (US); Douglas J. Hogberg, Fremont, CA (US); Bo Liang, Cupertino, CA (US); Edward Wai Yeung Liu, Milpitas, CA (US)

(73) Assignee: Nvidia Corporation, Santa Clara, CA (US)

(*) Notice: Subject to any disclaimer, the term of this patent is extended or adjusted under 35 U.S.C. 154(b) by 678 days.

(21) Appl. No.: 11/132,757

(22) Filed: May 18, 2005

Related U.S. Application Data

(60) Provisional application No. 60/647,077, filed on Jan. 24, 2005.

(51) Int. Cl.
*H03D 1/04* (2006.01)
(52) U.S. Cl. .................. 375/346; 375/316; 375/285; 327/310; 327/384; 327/551; 455/296
(58) Field of Classification Search .............. 375/346, 375/316, 285; 327/310, 384, 551; 455/296
See application file for complete search history.

(56) References Cited

U.S. PATENT DOCUMENTS

| | | | | |
|---|---|---|---|---|
| 4,983,970 A | * | 1/1991 | O'Donnell et al. | 341/122 |
| 5,020,137 A | * | 5/1991 | Barsumian | 455/351 |
| 5,802,463 A | * | 9/1998 | Zuckerman | 455/208 |
| 5,963,160 A | * | 10/1999 | Wilson et al. | 341/143 |
| 6,148,052 A | | 11/2000 | Bogdan | |
| 6,169,767 B1 | | 1/2001 | Strolle et al. | |

(Continued)

OTHER PUBLICATIONS

Liu, Tao, et al., "Variable Frequency Clock Generator For Synchronizing Data Rates Between Clock Domains in Radio Frequency Wireless Communication Systems," U.S. Appl. No. 11/954,935, filed Dec. 12, 2007.

(Continued)

*Primary Examiner*—Shuwang Liu
*Assistant Examiner*—Michael R Neff
(74) *Attorney, Agent, or Firm*—Cooley Godward Kronish LLP

(57) ABSTRACT

A radio frequency antenna system and high-speed digital data link are disclosed to, among other things, reduce electromagnetic interference ("EMI") at relatively high data rates while reducing the manufacturing complexities associated with conventional data links. In one embodiment, a radio frequency ("RF") antenna system includes an antenna and an RF radio coupled to the antenna for receiving wireless RF signals. In particular, the RF radio is configured to digitize RF signals at a fixed data rate to form digitized data signals and to apply the digitized data signals at a variable data rate to a high-speed digital link. The variable data rate distributes the signal energy of the digitized data signals over one or more bands of frequencies, thereby beneficially altering an EMI spectral profile describing emissions that develop as the digitized data signals are transported through a channel.

4 Claims, 7 Drawing Sheets

U.S. PATENT DOCUMENTS

| | | | |
|---|---|---|---|
| 6,233,200 B1 | 5/2001 | Knoll et al. |
| 6,501,307 B1 | 12/2002 | Yen |
| 6,643,317 B1 | 11/2003 | Blumer |
| 6,664,827 B2 | 12/2003 | O'Leary et al. |
| 6,687,319 B1 | 2/2004 | Perino et al. |
| 6,701,133 B1 | 3/2004 | Bennett et al. |
| 6,823,025 B2 | 11/2004 | Lee et al. |
| 6,973,145 B1 | 12/2005 | Smith et al. |
| 7,026,878 B2 | 4/2006 | Smith |
| 7,085,949 B2 | 8/2006 | Mar et al. |
| 7,230,981 B2 | 6/2007 | Hill |
| 7,236,057 B2 | 6/2007 | Kaizuka |
| 7,299,020 B2 | 11/2007 | Shen et al. |
| 7,333,527 B2 | 2/2008 | Greenstreet et al. |
| 7,389,095 B1 | 6/2008 | Liu et al. |
| 2005/0053120 A1 | 3/2005 | Kim et al. |
| 2005/0181741 A1 | 8/2005 | Raj et al. |
| 2005/0277396 A1 | 12/2005 | Pipilos |

OTHER PUBLICATIONS

Liu, Tao, et al., "Variable Frequency Clock Generator For Synchronizing Data Rates Between Clock Domains in Radio Frequency Wireless Communication Systems," U.S. Appl. No. 11/955,101, filed Dec. 12, 2007.

Liu, Tao, et al., "Variable Frequency Clock Generator For Synchronizing Data Rates Between Clock Domains in Radio Frequency Wireless Communication Systems," U.S. Appl. No. 12/106,167, filed Apr. 18, 2008.

* cited by examiner

RADIO FREQUENCY ANTENNA SYSTEM AND HIGH-SPEED DIGITAL DATA LINK TO REDUCE ELECTROMAGNETIC INTERFERENCE FOR WIRELESS COMMUNICATIONS

CROSS REFERENCE TO RELATED APPLICATION

This application claims the benefit of U.S. Provisional Application No. 60/647,077, entitled "Spread Spectrum Link Using a Spread Spectrum Clock for Wireless Communications" and filed on Jan. 24, 2005, the disclosure of which is incorporated herein by reference in its entirety.

BRIEF DESCRIPTION OF THE INVENTION

This invention relates generally to wireless communications, and more particularly, to an antenna system and digital link for exchanging digitized communications data with other radio signal processing circuits. The digital link is configured to reduce electromagnetic interference ("EMI") at relatively high data rates while reducing the manufacturing complexities associated with conventional data links.

BACKGROUND OF THE INVENTION

Traditionally, radio frequency ("RF") communications systems, such as those interacting with wireless local area networks ("WLANs"), arrange their constituent elements in one of two configurations. In a first approach, RF radio circuits are collocated with base band circuits, both of which are typically integrated as part of a chip set that includes, for example, medium access control ("MAC") layer circuits and/or a central processing unit ("CPU"). In a second approach, RF radio circuits are located remotely from the base band circuits. Generally, radio circuits include receiver circuits and/or transmitter circuits, or both, and base band circuits include modulating and demodulating circuits.

FIG. 1A shows a conventional communications system 100 that is representative of the first approach. System 100 arranges RF radio circuits 108 and base band subsystem 110, which includes base band circuits, at or near the same location on a common substrate 106, such as a printed circuit board ("PCB") or a single chip application-specific integrated circuit ("ASIC"). A crystal oscillator (not shown) is generally used to generate fixed clock signals to exchange digitized communications data between RF radio circuits 108 and base band subsystem 110. Cable 104 couples system 100 with an antenna 102 for receiving and transmitting RF signals. Importantly, the physical structure of cable 104 is designed contain emissions that might give rise to EMI. In this arrangement, antenna 102 resides at a location at some distance, "d," from RF radio circuits 108. To illustrate this arrangement, consider that a mobile computing device implements system 100 such that RF radio circuits 108 and base band subsystem 110 are both located below or near a keypad or key board, whereas and antenna 102 is located behind or near the top of a display (not shown). FIG. 1B shows another conventional communications system 150 that is representative of the second approach. But in this arrangement, RF radio circuits 108 are disposed adjacent antenna 102 at distance "d" from base band subsystem 110. Regardless, both approaches implement cable 104 as either a coaxial cable or some other kind of shielded cable to quell the effects of EMI.

While functional, both above-described approaches have several drawbacks. For example, cable 104 is implemented as a specialized coaxial cable to reduce deleterious EMI arising from clocking data with a fixed clock frequency. That is, cable 104 is usually a mini-coaxial or a micro-coaxial cable, both of which are relatively costly solutions to minimize EMI radiation. These cables are relatively complex to manufacture. As cable 104 is frequently used in mobile computing devices, such as in lap top computers, it must have a small cross-sectional area to pass through hinged mechanisms and to save space while providing sufficient EMI shielding. Further, mini-coaxial and micro-coaxial cables usually have relatively high cable losses at high frequencies and at relatively long lengths when data signals are transmitted as analog signals rather than digital signals.

In view of the foregoing, it would be desirable to minimize the above-mentioned drawbacks by providing an antenna system and a high-speed digital data link for placing radio circuits remotely from a base band circuit in an RF communications system.

SUMMARY OF THE INVENTION

A system, apparatus and method are disclosed for implementing a radio frequency antenna system and high-speed digital data link are disclosed to, among other things, reduce electromagnetic interference ("EMI") at relatively high data rates while reducing the manufacturing complexities associated with conventional data links. In one embodiment, a radio frequency ("RF") apparatus includes an RF radio coupled to the antenna for receiving wireless RF signals. In particular, the RF radio is configured to digitize RF signals at a fixed data rate to form digitized data signals and to apply the digitized data signals at a variable data rate to a high-speed digital link. The variable data rate distributes the signal energy of the digitized data signals over one or more bands of frequencies, thereby beneficially altering an EMI spectral profile. In one embodiment, the EMI spectral profile is altered by minimizing amplitudes of power for electromagnetic emissions as the signal energy is distributed over wider bands of frequencies as the digitized data signals are transported through a channel. Optionally, the RF apparatus can include an antenna to form an antenna system. In a specific embodiment, the a variable data rate has an average data rate that is configured to be synchronous, over an interval of time, with a fixed data rate. By synchronizing data rates across clock domains, the average data rates of the variable data rate can remain locked or substantially locked to a fixed data rate. Among other things, this enables continuous data transfers between multiple clock domains.

In a specific embodiment, the RF radio of the RF antenna apparatus operates as a radio transceiver (i.e., it both receives and transmits RF radio signals) and the high-speed digital link is bi-directional. For example, the high-speed digital link is configured to at least convey digitized data signals at the variable data rate from an external location to the RF antenna apparatus. Then, the RF antenna apparatus re-times or synchronizes data associated with the variable data rate to the fixed data rate to form digitized RF signals. The RF radio converts the digitized RF signals into RF signals (i.e., analog RF signals) prior to transmission out via the antenna.

In some embodiments, the variable data rate is configured to transport the digitized data signals in a first distribution of discrete frequencies greater than a fixed frequency associated with the fixed data rate and in a second distribution of discrete frequencies less than the fixed frequency so that over an interval of time the first distribution is equivalent to the second distribution. The first distribution and the second distribution are programmable to modify bandwidths for the one or more bands of frequencies for distributing signal energy of the digitized data signals over a larger or smaller number of frequencies. This enables compliance to limits defined by an emissions mask. The channel can include one or more unshielded conductors for transporting the digitized data signals as base band signals to a base band system. The unshielded conductors can have less shielding than coaxial cables and therefore are less costly to produce that the coaxial cables. The variable data rate is configured to transport the digitized data signals within a range of frequencies having an average frequency equivalent to either a fixed frequency associated with the fixed data rate or a multiple of the fixed frequency. In various embodiments, a transition bridge is included to transition propagation of the digitized data signals from the fixed data rate to the variable data rate, whereby an amount of data exiting the transition bridge at the variable data rate is equivalent over an interval of time to another amount of data entering the transition bridge at the fixed data rate.

In another embodiment, a dual-clocked RF radio transceiver is formed on a substrate as an integrated circuit ("IC") to receive and transmit RF signals via an antenna. The dual-clocked RF radio transceiver includes a fixed clock generator to generate a fixed clock signal having a fixed clock frequency, and a first number of radio circuits of the radio transceiver operably residing in a fixed clock domain implementing the fixed clock frequency. Also included is a rate-averaging spread clock generator to generate a variable clock signal having a variable clock frequency that varies within a range of frequencies having an average frequency substantially equal to the fixed clock frequency or a multiple thereof. The dual-clocked RF radio transceiver can also include a second number of radio circuits of the radio transceiver operably residing in a variable clock domain implementing the variable clock frequency, and a domain transition bridge configured to transition digital data signals between the first number of radio circuits and the second number of radio circuits. The domain transition bridge operates using both the fixed clock frequency and the variable clock frequency, and the rate-averaging spread clock generator is configured to minimize electromagnetic interference ("EMI") during transmission and reception of the digital data signals over unshielded conductors. In various embodiments of the present invention, the rate-averaging spread clock generator is configured to generate a variable clock frequency signal having an average clock frequency over an interval of time such that there exists substantially no offset between a fixed data rate in the fixed clock domain and an average data rate in the variable clock domain. With substantially no offset (e.g., an offset of zero direct current, or "DC"), the fixed and average data rates are substantially synchronous. In a specific embodiment, the domain transition bridge can be implemented as an amount of temporary storage having a selected size that avoids exceeding a "buffer overflow rate," which describes the data rate at which a buffer will overflow and data will be lost when data rates between clock domains are not substantially synchronized. By keeping data rates below the buffer overflow rate, proper reception and/or transmission of RF radio signals is maintained.

In yet another embodiment, a method for communicating radio frequency ("RF") signals with an antenna system includes radio circuits collocated with an antenna. The antenna system is configured to exchange digital data via an electromagnetic interference ("EMI")-compliant digital link with a base band system. The method includes generating a fixed clock signal having a fixed frequency and generating a rate-averaging spread spectrum clock signal having a variable frequency that varies within a range of frequencies about the fixed frequency or a multiple thereof. The method also includes propagating an RF signal via an RF path that includes radio processing circuits that operate in accordance to the fixed frequency, and retiming the rate of propagation of the RF signal (e.g., as a digitized RF signal) from the fixed clock to the variable frequency to form a retimed, digitized RF signal. Further, the method includes driving the retimed, digitized RF signal to an output port for transportation to the base band system. The rate-averaging spread spectrum clock signal is configured to minimize energy peaks at specific frequencies so that the digital link complies with predetermined limits defining permissible amounts of EMI emission.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1A:
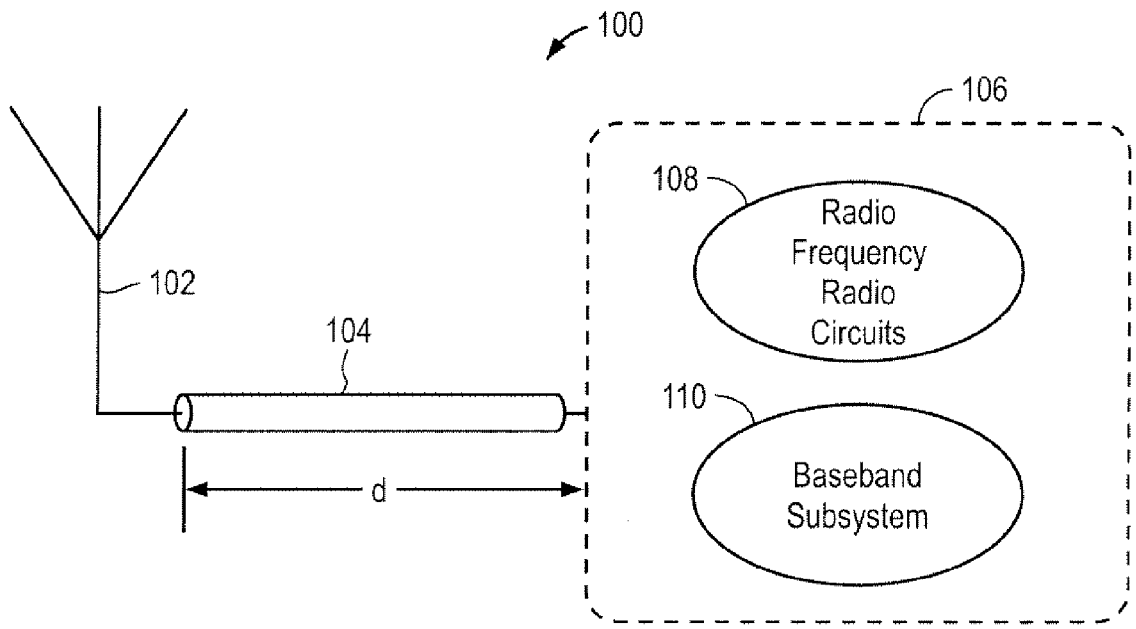
FIGS. 1A and 1B exemplify commonly-used configurations for radio frequency communications systems.
Figure 1B:
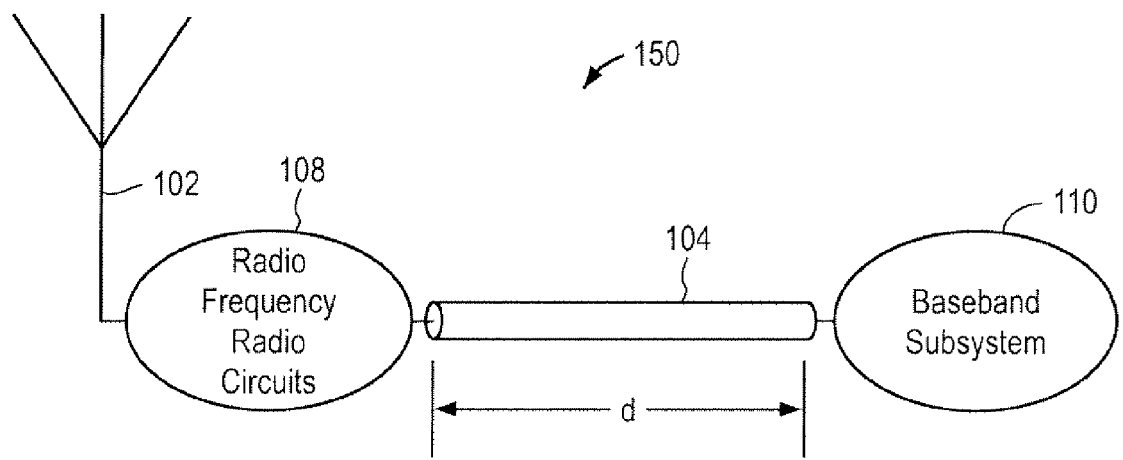
Figure 2:
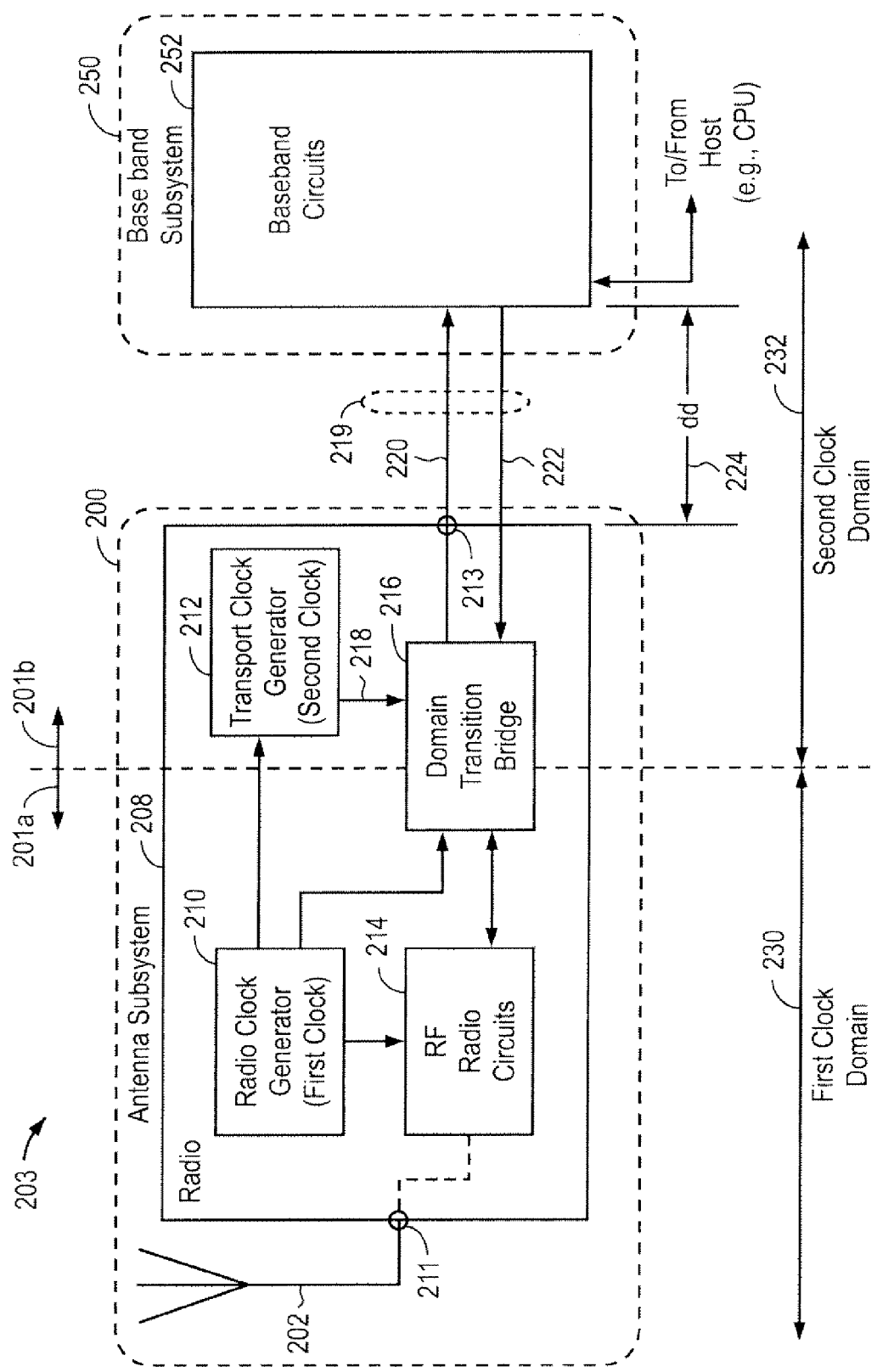
FIG. 2 illustrates an example of an antenna subsystem for a radio frequency communications system, according to one embodiment of the present invention.

FIG. 2 illustrates an example of an antenna subsystem for a radio frequency ("RF") communications system 203, according to one embodiment of the present invention. An antenna subsystem 200 includes an antenna 202 and a radio 208 for exchanging communications data via a high-speed digital link 219 with a base band subsystem 250, whereby radio 203 operates to transmit and/or receive wireless signals, such as RF signals from 3 kHz and 300 GHz (including VHF, UHF, and microwave frequencies). High-speed digital link 219 reduces interfering emissions (i.e., electromagnetic interference, or "EMI") that might otherwise violate a specific emission mask. An emission mask defines the maximum power levels of EMI emissions that RF communications system 203 can emit over frequency under certain operating conditions. As shown, antenna subsystem 200 includes at least two clocks, each of which defines a separate clock domain. In particular, a radio clock generator 210 defines a first clock domain 230 and produces a first clock for clocking (i.e., controlling the timing) one portion 201a of radio 208. Portion 201a includes radio clock generator 210 and RF radio circuits 214 that implement either a radio transmitter or a radio receiver, or both as a radio transceiver. A transport clock generator 212 defines a second clock domain 232 and produces a second clock for clocking another portion 201b of radio 208 as well as high-speed digital link 219 and at least a portion of base band circuits 252. Antenna subsystem 200 also includes a domain transition bridge 216 interfacing both clock domains 230 and 232 to transition propagation of data signals between those two domains.

According to a specific embodiment of the present invention, radio clock generator 210 produces a fixed frequency clock signal having a fixed clock frequency, and transport clock generator 212 produces a variable frequency clock signal 218 having a variable clock frequency. Variable frequency clock signal 218 drives communications data over high-speed digital link 219 over a range of frequencies so as to distribute the signal energy of the signals embodying the communications data over one or more bands of frequencies, thereby minimizing energy of electromagnetic emissions (i.e., EMI) from high-speed digital link 219. In one embodiment, transport clock generator 212 is a rate-averaging spread spectrum clock generator and variable frequency clock signal 218 is a rate-averaging spread spectrum clock signal that, among other things, is designed to synchronize data rates between the two clock domains to, for example, make an average data rate of variable data rates equal to, or substantially equal to, a fixed data rate. In some embodiments, variable frequency clock signal 218 is configured to transport communications data within a range of frequencies that is centered at an average frequency, which is equal to a frequency that is one or more times that of the fixed clock frequency. As such, the throughput of data between clock domains 230 and 232 is set to be relatively constant over intervals of time to ensure that communications data is continuously exchanged between the clock domains. With substantially no offset (i.e., a zero direct current, or "DC," offset), the fixed and average data rates are substantially synchronous. In a specific embodiment, the domain transition bridge can be implemented as an amount of temporary storage having a selected size that avoids exceeding a "buffer overflow rate," which describes the data rate at which a buffer will overflow and data will be lost when data rates between clock domains are not substantially synchronized. By keeping data rates below the buffer overflow rate, proper reception and/or transmission of RF radio signals is maintained. Otherwise, mismatched data rates between the two clock domains would introduce delays and loss of data. In addition to or separate from reducing EMI, transport clock generator 212 in some embodiments produces variable frequency clock signal 218 to reduce spurious noise or spurs that could affect noise-sensitive portions of RF radio circuits 214 (e.g., on-chip analog radio transmitter circuits).

In a specific embodiment, transport clock generator 212 and its clock are programmable to modify the width of the bands of frequencies so that signal energy of communication data signals can be distributed over a larger or a smaller number of frequencies to comply with limits defined by emissions masks, examples of which are typically set forth by the Federal Communications Commission ("FCC"), the Institute of Electrical and Electronics Engineers, Inc. ("IEEE"), or other regulatory bodies. For example, band of frequencies can be increased or decreased in width to modify the spectral power. In at least one embodiment, high-speed digital link 219 includes an outgoing channel 220 and an incoming channel 222, both of which carries communications data clocked by variable frequency clock signal 218. Each of these channels can be composed of one or more unshielded conductors. As unshielded conductors have less shielding than coaxial cables and are less complicated to manufacture than mini-coaxial and micro-coaxial cables, the constituent elements of high-speed digital link 219 are therefore less costly to produce than coaxial cables. In some embodiments, high-speed digital link 219 includes one or more drivers (not shown) to differentially drive communications data signals via unshielded conductors having lengths ("dd") 224, such as 20 centimeters or greater. Further, high-speed digital link 219 does not exhibit significant cable losses when transporting digitized data signals as does analog data signals being transmitted via coaxial cables.

In operation, RF radio circuits 214 receive analog RF signals from antenna 202, which can be coupled to radio 208 at an input port 211. RF radio circuits 214 can include, for example, up converters, down converters, mixers, amplifiers, filters, analog-to-digital ("A/D") converters, and digital-to-analog ("D/A") converters, all or some of which are specific to operating RF radio circuits 214 as either a radio receiver or a radio transmitter, or both. A fixed clock of radio clock generator 210 controls the timing of RF radio circuits 214, and is also fed into transport clock generator 212 for generating variable frequency clock signal 218. Radio clock generator 210 and transport clock generator 212 both supply their respective clocks to domain transition bridge 216 for retiming communications data passing between clock domains 230 and 232. So if an A/D converter (not shown) is present in RF radio circuits 214, the A/D converter digitizes analog RF signals at a fixed data rate to form digitized data signals, which include the communications data. The digitized data signals are then applied to an output port 213 at a variable data rate to spread the signal energy of the digitized data signals over bands of frequencies to reduce spectral power of EMI. Output port 213 is coupled to outgoing channel 220 to covey the digitized data signals to base band circuit 252 for base band processing, such as demodulation. Consider next that RF radio circuits 214 include radio transmitter circuits coupled to antenna 202 for transmitting analog RF signals. Digitized data signals bound for transmission at antenna initially exits base band circuit 252 and then traverses incoming channel 222 at the variable data rate, whereby domain transition bridge 216 is configured to transition the digital data signals from the variable data rate (i.e., the variable data transfer rate) to the fixed data rate (i.e., the fixed data transfer rate). Then, a D/A converter (not shown) converts the digital data signals at the fixed data rate to analog RF signals for transmission out from antenna 202.

Figure 3:
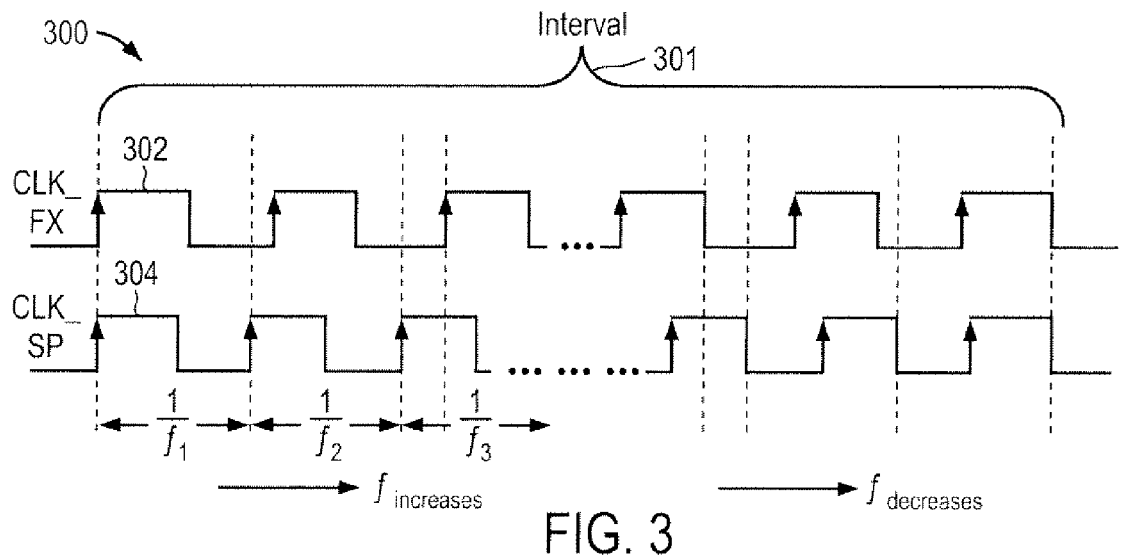
FIG. 3 is a timing diagram illustrating examples of fixed and variable clock signals in accordance with one embodiment of the present invention.

FIG. 3 is a timing diagram 300 illustrating examples of fixed and variable clock signals in accordance with one embodiment of the present invention. Fixed clock signal ("CLK_FX") 302 is shown to have a fixed clock frequency, and hence a fixed period between rising edges. Variable or rate-averaging spread clock signal ("CLK_SP") 304 is shown to have a progression of varying clock periods corresponding to a variable clock shown to be composed of three discrete frequencies, such as frequencies f1, f2, f3, etc. Rate-averaging spread clock signal ("CLK_SP") 304 is shown to be increasing in frequency in the first part of interval 301 (starting at the left of FIG. 3) up to a maximum frequency (not shown), such as Fmax 510 (FIG. 5), and decreasing in frequency in the second part of interval 301 (to the right of FIG. 3). Note that over interval 301, the average data rate for variable or rate-averaging spread clock signal 304 is shown to be equal to a fixed data rate based on fixed clock signal ("CLK_FX") 302.

Figure 4:
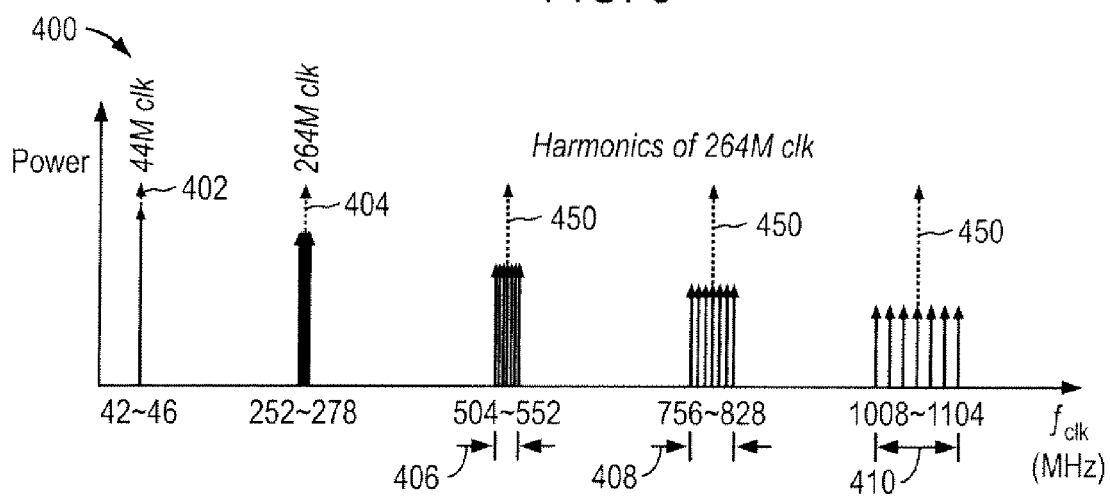
FIG. 4 is a diagram showing the power spectral density of an exemplary fundamental frequency as well as its harmonics in accordance with an embodiment of the present invention.

FIG. 4 is a diagram 400 showing the power spectral density of an exemplary fundamental frequency as well as its harmonics for a given resolution bandwidth, or "RBW", according to one embodiment of the present invention. Although the RBW, the fixed clock frequency and the average clock frequency can be any frequency, in this particular example the RBW is 100 kHz, fixed clock signal 402 is 44 MHz, and average frequency 404 is 264 MHz, which is a six times that of fixed clock frequency 402. Transport clock generator 212 (FIG. 2) operates to spread the power of fixed clock signal 402 so that harmonics thereof are not concentrated in single tones 450 at different harmonic frequencies. Tones 450 are also known as "spurs." By spreading the clock, the power of spurs will be distributed over a wider bandwidth, thereby reducing the interference noise floor. So at higher frequencies, where EMI radiation is typically higher, transport clock generator 212 increases the range of frequencies over which to spread power, therefore decreasing the power density at those bands of frequencies. For example, as the harmonic index increases for average frequency 404, each the one or more bands of frequencies 406, 408, and 410 widen to include more frequencies at each harmonic, thereby reducing the power at the respective bands of frequencies.

Figure 5:
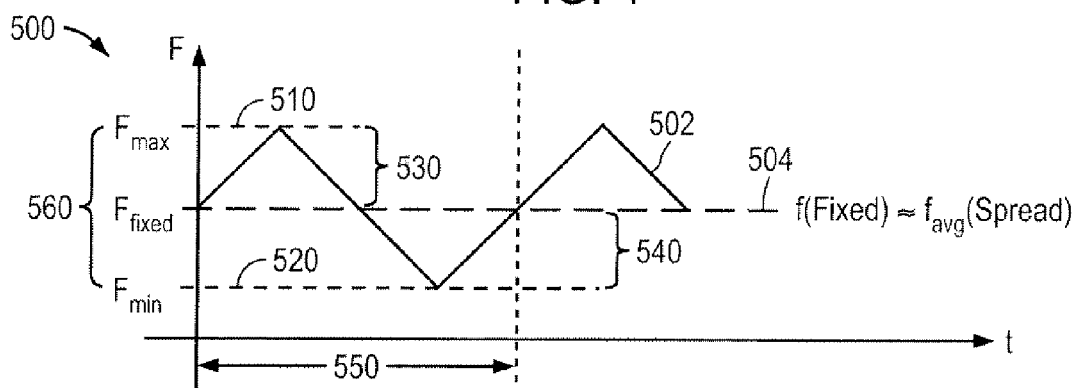
FIG. 5 is a diagram showing an example of spreading frequencies of a variable frequency clock signal about a fixed frequency clock signal in accordance with one embodiment of the present invention.

FIG. 5 is a diagram 500 showing an example of spreading frequencies of a variable frequency clock signal about a fixed frequency clock signal in accordance with one embodiment of the present invention. Radio clock generator 210 (FIG. 2) generates a fixed frequency clock signal having a fixed frequency ("f(Fixed)") 504. Transport clock generator 212 generates a variable frequency 502 that varies between a maximum frequency ("Fmax") 510 and a minimum frequency ("Fmin") 520. Notably, transport clock generator 212 centers the average of the variable frequency ("favg(spread)") at fixed frequency 504. By doing so, digitized data signals enter into or exit transition bridge 215 within clock domain 232 at an average data rate, which is based on the average of the variable frequency ("favg(spread)"). Similarly, digitized data signals enter into or exit transition bridge 215 within clock domain 230 at f(Fixed) 504. With the average frequency of variable frequency 502 being set at f(Fixed) 504, the data throughput between the clock domains is relatively constant over time.

FIG. 5 shows that the variable data rate transports the communications data signals (e.g., digitized data signals) at a first distribution of frequencies greater 530 than a fixed frequency associated with the fixed data rate and at a second distribution of frequencies 540 less than the fixed frequency so that over an interval of time 550, the first distribution is equivalent to the second distribution. Accordingly, the variable data rate transports the digitized data signals within a range of frequencies 560 having an average frequency equivalent to a fixed frequency (or a multiple thereof) associated with the fixed data rate. Note that in some embodiments where the average frequency is set to a multiple of the fixed frequency for transport over a high-speed digital link, the average frequency is divided down before it is applied to a domain transition bridge to form an average data rate that is equal to a fixed data rate. In a specific embodiment, domain transition bridge 216 transitions the propagation of the digitized data signals such that an amount of data exiting domain transition bridge 216 at the variable data rate into clock domain 232 is equivalent over an interval of time to another amount of data entering domain transition bridge 216 at the fixed data rate from clock domain 230. Consequently, substantially no offset is associated between the average data rate (of the variable data rate) and the fixed data rate. The variable frequency clock signal, therefore, establishes a zero direct current ("zero DC") spectral offset for the variable frequency clock signal at the average frequency. In a specific embodiment of the present invention, domain transition bridge 216 is a storage medium configured to store and to retrieve amounts of data at about the same rate, so long as the average frequency is synchronized or made equal to the fixed frequency.

In embodiments where domain transition bridge 216 is composed of one or more buffers, digitized data signals can be clocked at a fixed data rate into a buffer of domain transition bridge 216. Also, digitized data signals can be clocked out from that buffer at a variable data rate (and vice versa). Advantageously, transport clock generator is configured to synchronize the average data rate to be equal to the fixed data rate to reduce deviations from that fixed rate, thereby minimizing the size of the buffer. This is because an amount of data entering the buffer at a fixed data rate is equivalent to another amount of data exiting the buffer at the average data rate (i.e., at the variable data rate, over time). Domain transition bridge 216 can have at least one buffer characteristic, buffer overflow rate ("B(over)"), which describes the data rate at which a buffer will overflow and data will be lost for a given amount of temporary storage. Any variable data rate that exceeds the buffer overflow rate causes data entering into domain transition bridge 216 to be lost. Similarly, the fixed data rate can exceed the buffer overflow rate when the variable data rate, as the output rate, is below the fixed data rate, as the input rate. By synchronizing data rates between a fixed clock domain and a variable clock domain, transport clock generator 212 can minimize the amount of temporary storage required to transition digitized communications data between multiple clock domains by minimizing the deviations in the two data rates. This ensures that the buffer overflow rate is not exceeded. Note that in some embodiments, a different buffer overflow rate may be applicable to each emission mask requiring compliance. In some cases, range 560 may include more frequencies for one emission mask and fewer frequencies for another emission mask. Enough temporary storage should be reserved so that when the input rate of data entering domain transition bridge 216 exceeds the output rate, the buffer overflow rate is not exceeded regardless of amount of frequencies in the range. Typically, the amount of memory is set based on the largest applicable range of frequencies 560.

Figure 6:
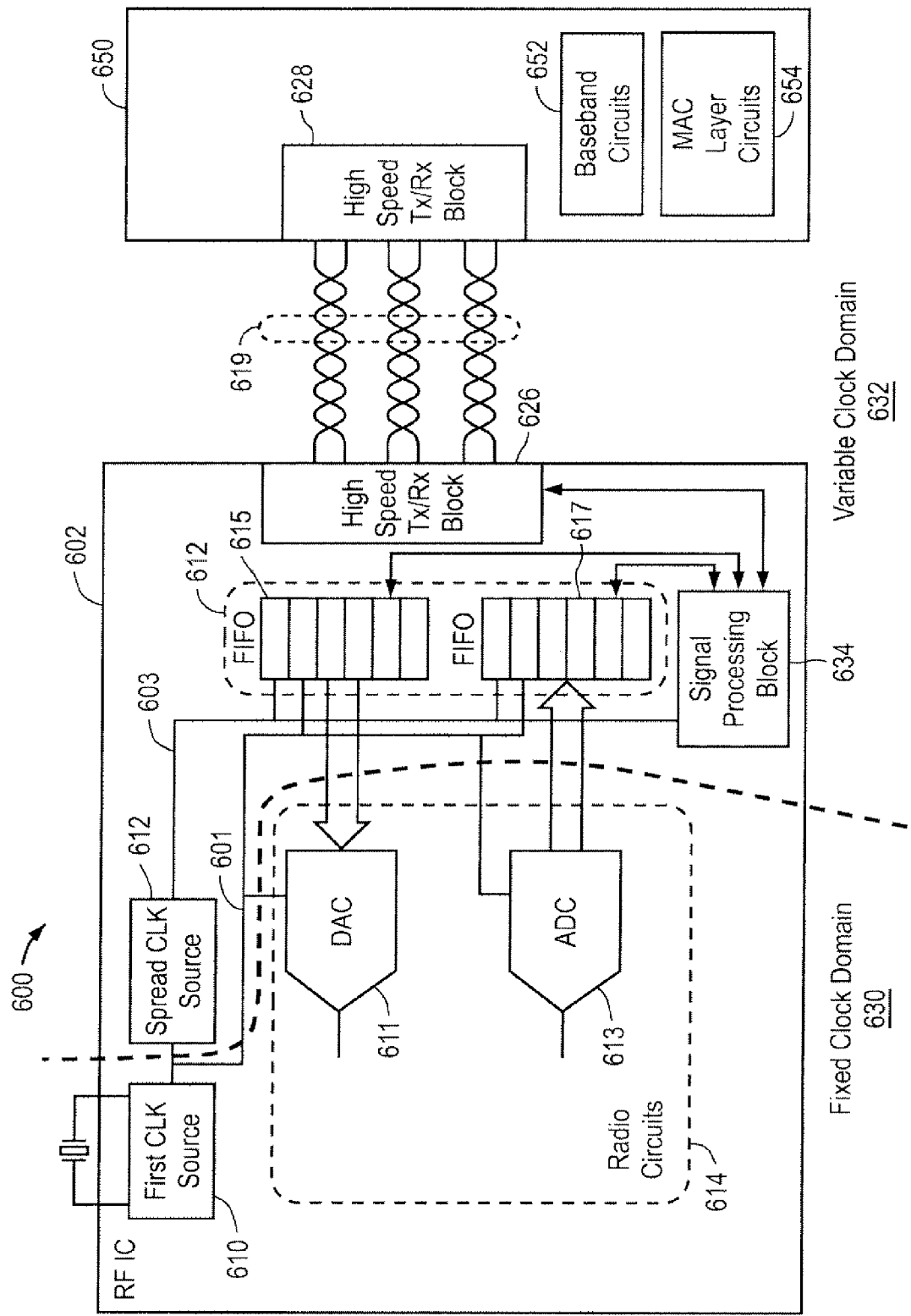
FIG. 6 illustrates a radio of an antenna subsystem for a specific implementation of an RF communications system, according to one embodiment of the present invention.

FIG. 6 illustrates a radio of an antenna subsystem for a specific implementation of an RF communications system 600, according to one embodiment of the present invention. Radio 602 exchanges communications data via a high-speed digital link 619 with a base band subsystem 650. In this example, base band subsystem 650 is a base band processor including base band circuits 652 for, among other things, modulating and demodulating communications data signals from radio 602 at the physical ("PHY") layer. Medium access control ("MAC") layer circuits 654 provide an interface with a wireless LAN or other networks. In one embodiment, base band circuits 652 and MAC layer circuits 654 are configured to support 802.11-based protocols for communicating between 802.11 stations (e.g., RF radio network cards and access points). In one embodiment, radio 602 can be formed in an RF integrated circuit ("IC") separate from an IC containing base band subsystem 650. For instance, RF IC can be manufactured using a complementary metal oxide semiconductor ("CMOS") processing technology.

Radio 602 includes a fixed clock generator ("First CLK Source") 610 and a variable clock generator ("Spread CLK Source") 612 for respectively generating a fixed clock signal 601 and a variable clock signal 603. Fixed clock generator 610 defines a fixed clock domain 630 and produces fixed clock signal 601 to time operations of radio circuits 614, which are shown to include a D/A converter ("DAC") 611 and an A/D converter ("ADC") 613. Variable clock generator 612 defines a variable clock domain 632 and produces variable clock signal 603 to time operations of optional signal processing block 634, high-speed transmit/receive ("Tx/Rx") block 626, high-speed digital link 619, high-speed Tx/Rx block 628 and at least a portion of base band subsystem 250. Optional signal processing block 634 is implemented to provide filtering, for example, of digitized data signals traversing high-speed digital link 619. Radio 602 also includes a domain transition bridge 612 interfacing both clock domains 630 and 632, domain transition bridge 612 being composed of first-in first-out ("FIFO") buffers 615 and 617 for respectively interacting with D/A converter 611 and A/D converter 613. Each of FIFOs 615 and 617 are configured to have data stored and retrieved at rates defined by fixed clock signal 601 and variable clock signal 603. For example, if radio circuits 614 are operating as a RF receiver, then analog RF signals are eventually input into A/D converter 613 and digitized. FIFO 617 then stores the data of the digitized data signals in its memory locations at a fixed data rate determined by fixed clock signal 601. Then, that data is then retrieved from FIFO 617 at a variable data rate, which over time averages to be equal to the fixed data rate. High-speed Tx/Rx block 626 receives that data and then transmits it over high-speed digital link 619. If radio circuits 614 are operating as a RF transmitter, then FIFO 615 and D/A converter 611 operates in a similar, but reverse manner. In some embodiments, radio circuits 614 operate to transmit and/or receive wireless signals, such as radio frequency ("RF") signals from 3 kHz and 300 GHz (including VHF, UHF, and microwave frequencies).

In one embodiment, fixed clock generator 610 is a crystal oscillator and high-speed digital link 619 is composed of unshielded conductors in the form of unshielded twisted pair ("UTP") cables. Further, high-speed Tx/Rx blocks 626 and 628 each are composed of one or more low voltage differential signal ("LVDS") transmitters and/or LVDS receivers. LVDS technology is well-known for use in other distinct fields and provide a low noise, low power, low amplitude method for high-speed (gigabits per second) data transmission over copper wire. By implementing LVDS, data can travel over greater lengths of wire while maintaining a clear and consistent data stream.

In various embodiments of the present invention, the antenna system includes at least two clock generators and two clock domains, one clock being a rate-averaging spread spectrum clock generator that is configured to vary frequencies over a range of frequencies being centered at an average so that the throughput of data between clock domains remains relatively constant over intervals of time to avoid mismatched data rates between the clock domains. Although some liquid crystal display drivers implement a single spread spectrum clock to reduce EMI, those spread spectrum clocks operate to effectuate one-way data transfers. As RF communication applications require two-way data transfers, the traditional spread spectrum clocks are not suitable for practicing embodiments of the variable frequency clock generator of the present embodiments. Further, the spread spectrum clocks used for liquid crystal display drivers do not have strict operational tolerances. Consequently, liquid crystal display drivers can still operate data is lost during the one-way data transfer are too fast, or if data is delayed because the data transfer rate is too slow. Consequently, the liquid crystal display drivers do not require an average data transfer rate provided by the spread spectrum clocks.

Figure 7:
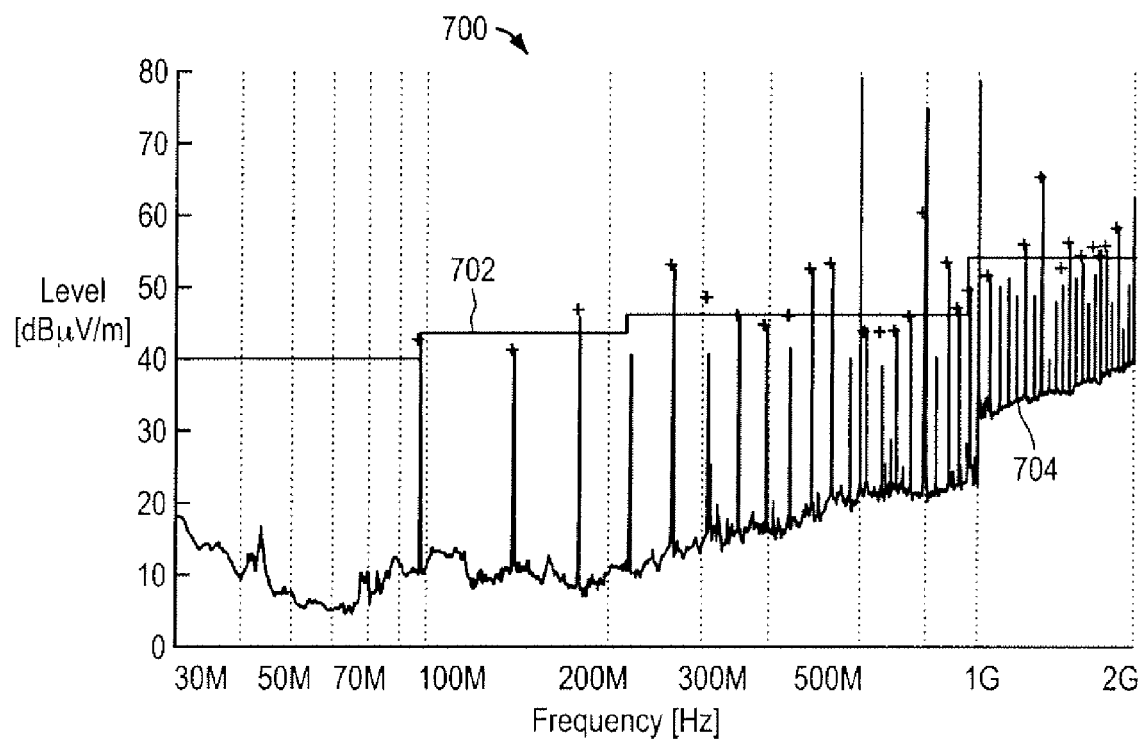
FIGS. 7 and 8 respectively depict emissions from a high-speed digital link when rate-averaging spreading is not implemented and when it is implemented, according to one embodiment of the present invention.
Figure 8:
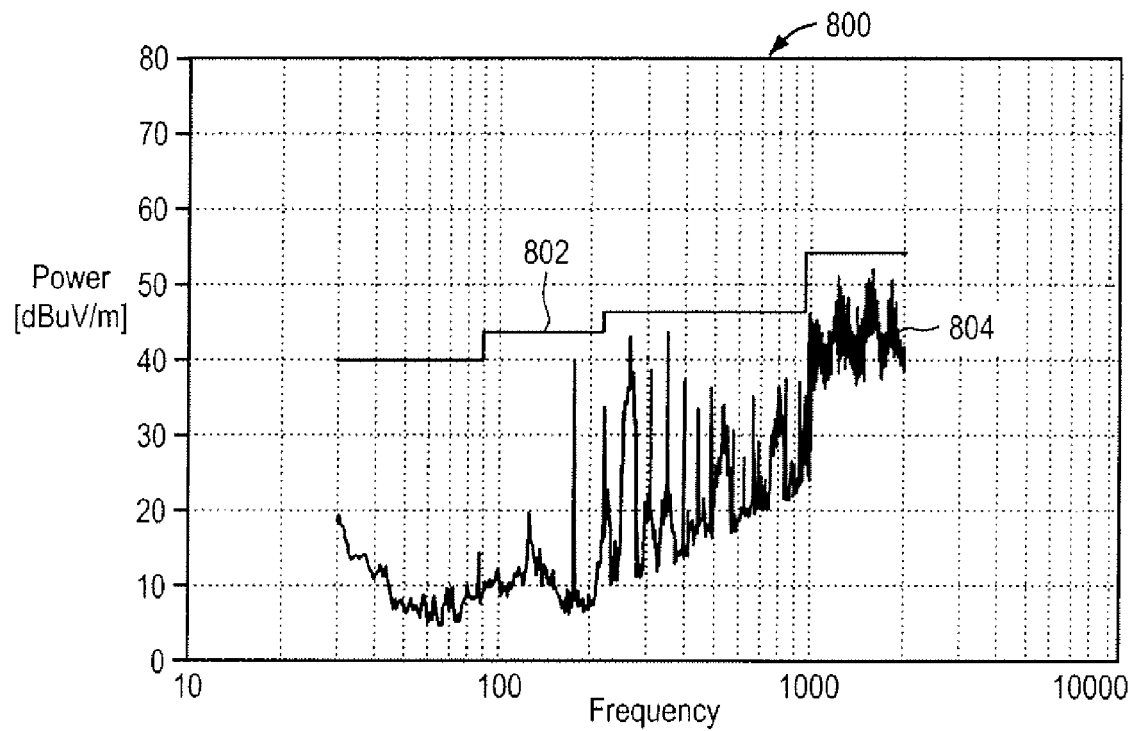

FIGS. 7 and 8 respectively depict emissions from a high-speed digital link when rate-averaging spreading is not implemented and when it is implemented, according to one embodiment of the present invention. Graph 700 illustrates a particular emissions mask 702 being violated by emissions amplitude 704 over frequency, whereas graph 800 illustrates that a communication system in accordance with embodiments of the present invention has emissions 804 that comply with emissions mask 802 over frequency. In one embodiment, emissions masks 702 and 802 are a class B emissions mask set forth by the FCC. For example, these emission masks define limits of radiated emissions to 40, 43.5, 46 and 54 dBµV/m for respective frequency ranges 30 to 88, 88 to 216, 216 to 960 and greater than 960 MHz. In other embodiments, communication systems and/or elements thereof can comply with spectral mask limitations for 802.11a/b/g devices and/or other standards of the IEEE 802.11 family.

Figure 9:
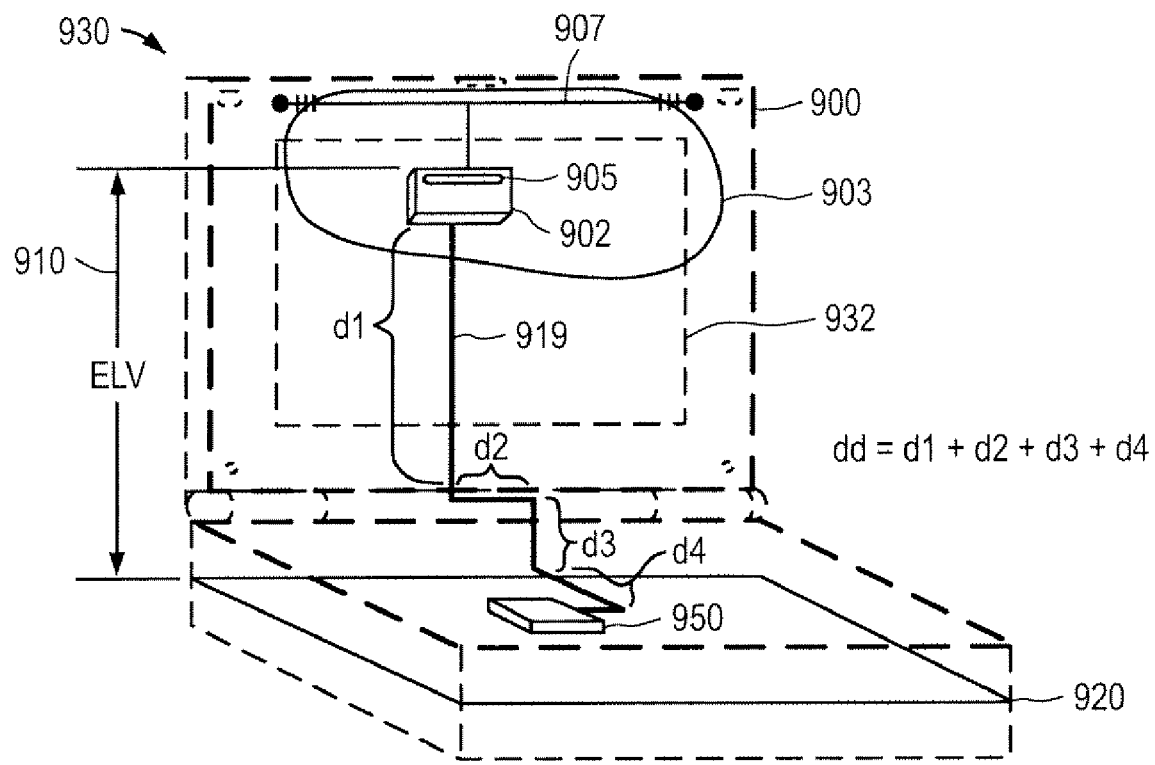
FIG. 9 illustrates a system for communicating RF signals that is compliant with an emission mask defining permissible levels of EMI, according to at least one embodiment of the present invention.

FIG. 9 illustrates a system for communicating RF signals that is compliant with an emission mask defining permissible levels of EMI, according to at least one embodiment of the present invention. Mobile computing device 900 is representative of a device implementing an RF antenna subsystem 903 and a high-speed digital link 919. As shown, RF antenna subsystem 903 can implement a wire-like antenna 907 terminating at one or more locations nearest an optimum (i.e., a highest) elevation ("ELV") 910 above base 920, which includes base band circuit 950. In other embodiments, RF antenna subsystem 903 can implement an antenna 905 that is formed on (e.g., printed on) top of or near a device package including radio 902, which can be formed in an RF integrated circuit ("IC") package. The length of high-speed digital link 919 is shown as "dd," which is the sum of segments d1, d2, d3, and d4. Typically, base band circuit 950 is located below the keyboard with antenna subsystem 903 being located near or at the top of the lid 930 or display 932 of mobile computing device 900, which can be a lap top, a PDA, a mobile phone, and the like.

Figure 10:
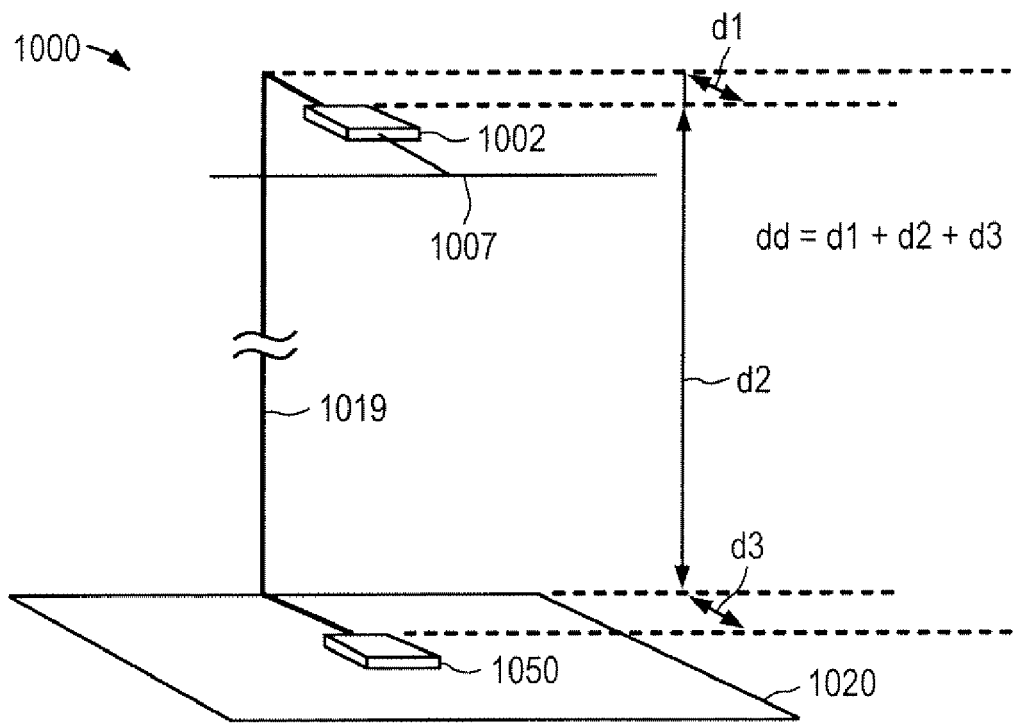
FIG. 10 illustrates a general system or an electronic device for communicating RF signals that is compliant with emission masks defining permissible levels of EMI, according to at least one embodiment of the present invention.

FIG. 10 illustrates a general system for communicating RF signals that is compliant with emission masks defining permissible levels of EMI, according to at least one embodiment of the present invention. System 1000 includes an RF IC 1002 implementing an antenna subsystem of the present invention such that RF IC 1002 is located on any portion (not shown) of a first member of structure (not shown) in an optimal orientation to receive and transmit RF signals, if applicable. A base band IC 1050 is located on a portion 1020 of a second member of the structure, the portion of the first member being at an elevation, d2, above portion 1020 during operation to send and to receive the RF radio signals, whereby the length, dd, is the sum of segments d1, d2, and d3. In one embodiment, length dd is at least twenty centimeters. System 1000 can be implemented in a wireless printer or any other wireless device including a medium access controller ("MAC") module for operating the system in a wireless local area network ("WLAN").

Figure 11:
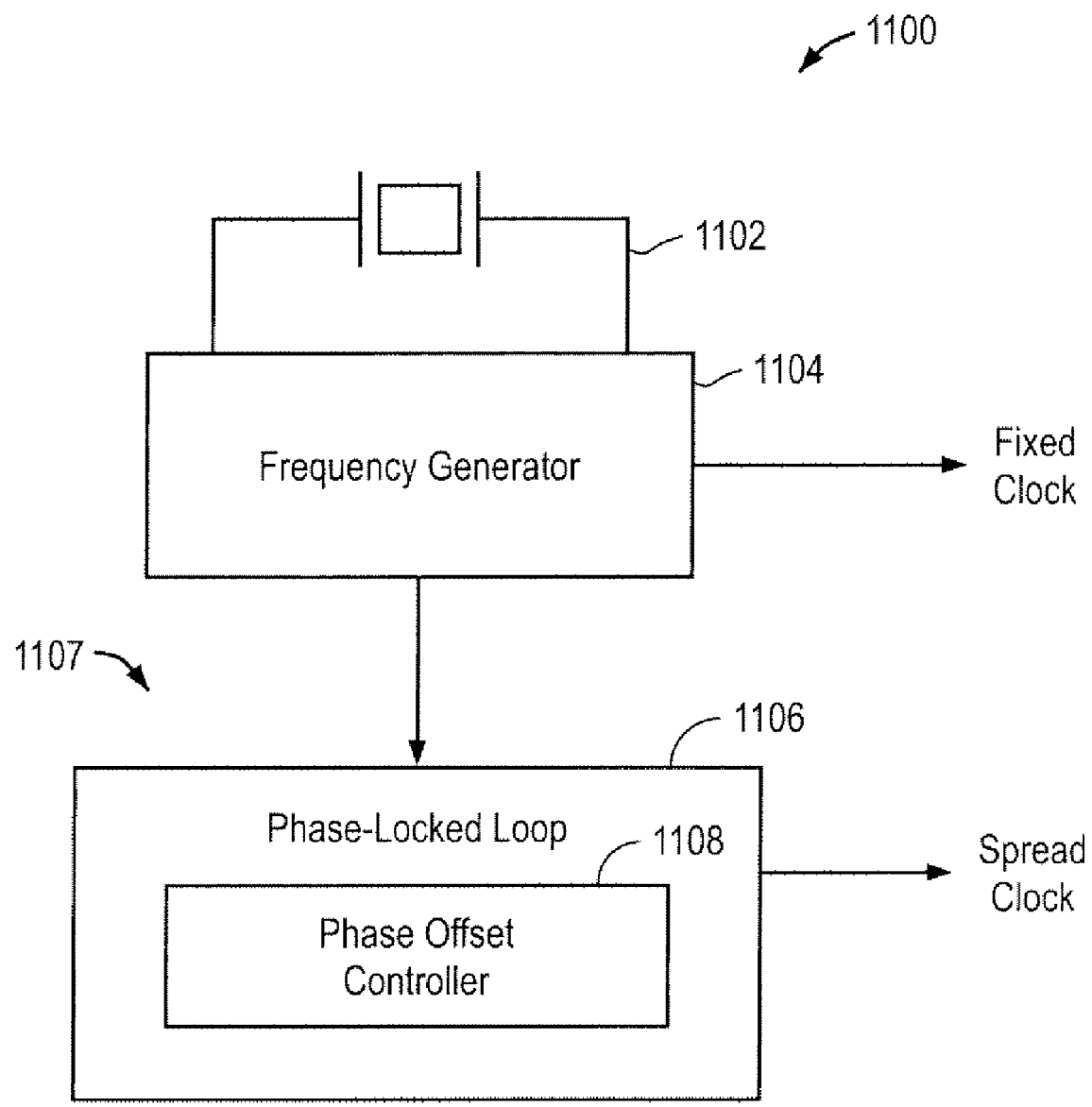
FIG. 11 depicts a block diagram for specific implementations of a variable frequency clock generator, according to one embodiment of the present invention.

FIG. 11 depicts a block diagram for specific implementations of a variable frequency clock generator 1100, according to one embodiment of the present invention. A fixed clock generator 1104 implements a crystal oscillator 1102 to generate a fixed frequency clock. A variable clock generator 1107 implements a phase-locked loop 1106 including a phase offset controller 1108 to provide substantially no offset between a data rate at which data signals operate in the fixed clock domain and a data rate at which data signals operate in the variable clock domain. The variable frequency clock signal (the "spread clock"), therefore, establishes a zero DC spectral offset for the variable frequency clock signal at the average frequency. In one embodiment, a suitable variable frequency clock generator for implementing variable clock generator 1107 is described in U.S. patent application Ser. No. 11/132,978 entitled "Variable Frequency Clock Generator for Synchronizing Data Rates between Clock Domains in Radio Frequency Wireless Communication Systems" and filed on May 18, 2005 with the disclosure of which is incorporated herein by reference in its entirety.

An example of frequencies that the communication system of the present invention is suitable to transmit and receiver are those used in wireless LAN applications, which can be governed by IEEE standard 802.11. The present invention is applicable to a wide-range of frequencies in which EMI radiation reduction, among other things, is desired in a communications system (e.g., RF communications). EMI reduction, minimization and negation can be view in view of FCC emissions standards and masks, as well as other EMI specifications. The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to an RF communications system, the discussion is applicable to all communications systems. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A system for communicating radio frequency ("RF") signals that is compliant with emission masks defining permissible levels of electromagnetic interference ("EMI"), the system comprising:

an RF antenna subsystem including:
   an antenna, and
   an RF radio receiver formed on a substrate as an RF integrated circuit ("IC") and having two clock generators and two clock domains including a first clock domain having a fixed data rate for clocking RF radio circuits and a second clock domain having a variable data rate for transporting digital data to a separate base band subsystem with an increased frequency distribution compared with the fixed data rate, said RF antenna subsystem having:
      an input port coupled to said antenna to receive wireless RF signals and
      an output port, said RF radio receiver being configured to digitize said RF signals at the fixed data rate to form digitized data signals and to apply said digitized data signals at a variable data rate to said output port for transport of said digitized data signals to said separate base band subsystem, said RF radio receiver including:
         a fixed clock generator determining said fixed data rate and
         a rate-averaging spread spectrum clock generator determining said variable data rate, said RF radio receiver including:
            a transition bridge for exchanging digitized data signals across said two clock domains at an average data rate of said variable data rate that is equivalent to said fixed data rate;
and
the separate base band subsystem formed on another substrate as a base band IC configured to at least demodulate said digitized data signals, the separate base band subsystem coupled to the output port of the RF subsystem via unshielded conductors with the increased frequency distribution of the digitized data signals reducing EMI associated with data transport over the unshielded conductors.

2. The system of claim 1 wherein said RF IC is located on a portion of a first member of a structure and said base band IC is located on a portion of a second member of said structure, said portion of said first member being at an elevation above said portion of said second member during operation to send and to receive said RF radio signals, whereby the length of said high-speed digital link is at least twenty centimeters.

3. The system of claim 2 wherein said structure is a housing for a mobile computing device and said first member is a lid that when opened places said RF antenna subsystem at said elevation, said second member being included in a base for said mobile computing device.

4. The system of claim 1 wherein said antenna is formed on a surface supporting or adjacent to said RF IC and said base band circuit includes a medium access controller ("MAC") module for operating said system in a wireless local area network ("WLAN").

* * * * *